US006462774B1

United States Patent
Bildstein

(10) Patent No.: US 6,462,774 B1
(45) Date of Patent: Oct. 8, 2002

(54) SURVEILLANCE SYSTEM METHOD AND APPARATUS

(76) Inventor: Dale Bildstein, 3030 1$^{st}$ Ave. NE., Suite 103, Cedar Rapids, IA (US) 52402

( * ) Notice: Subject to any disclaimer, the term of this patent is extended or adjusted under 35 U.S.C. 154(b) by 0 days.

(21) Appl. No.: 09/466,032

(22) Filed: Dec. 20, 1999

(51) Int. Cl.$^7$ ................................. H04N 7/18
(52) U.S. Cl. ........................... 348/143; 348/155
(58) Field of Search ................... 348/143, 161, 348/220, 159, 155, 798; 382/274, 254, 271, 162, 167, 141

(56) References Cited

U.S. PATENT DOCUMENTS

| | | | | |
|---|---|---|---|---|
| 3,953,668 A | * | 4/1976 | Judice | .................. 348/798 |
| 4,257,063 A | | 3/1981 | Loughry et al. | |
| 4,772,945 A | * | 9/1988 | Tagawa et al. | .............. 358/494 |
| 4,857,912 A | | 8/1989 | Everett, Jr. et al. | |
| 4,943,854 A | * | 7/1990 | Shiota et al. | ............... 348/159 |
| 5,095,365 A | | 3/1992 | Takatoo et al. | |
| 5,467,402 A | * | 11/1995 | Okuyama et al. | ............ 382/104 |
| 5,619,185 A | | 4/1997 | Ferraro | |
| 5,745,166 A | | 4/1998 | Rhodes et al. | |
| 5,754,106 A | | 5/1998 | Goodwin, III | |
| 5,949,918 A | * | 9/1999 | McCaffrey | ................... 382/274 |

* cited by examiner

Primary Examiner—Chris Kelley
Assistant Examiner—Behrooz Senfi
(74) Attorney, Agent, or Firm—James C. Nemmers

(57) ABSTRACT

A surveillance system that monitors video signals (composite or s-video) from surveillance cameras to detect a degradation of the ambient lighting sources in and around public and private areas. The system also monitors for the black level of a video signal from a surveillance camera that is created by situations such as the covering of an operating camera or spray paint put on camera lenses by vandals. The system also monitors for loss of video that may be caused by loss of power, vandals damaging cameras, or cutting video cables. The surveillance system as a whole can be used with existing video equipment to monitor and detect programmed levels of the previous described situations and to supply alarm signals to an existing alarm station or to a remote alarm station.

17 Claims, 1 Drawing Sheet

SURVEILLANCE SYSTEM METHOD AND APPARATUS

BACKGROUND OF THE INVENTION

This invention relates to improvements in surveillance and intruder detection systems, and in particular the invention relates to systems in which the quality of ambient lighting and the quality and existence of video signals of the surveillance system and of the surveillance field of view are monitored so as to provide appropriate signals when light degradation and/or loss of video is detected, or if the surveillance system itself fails.

The invention addresses the problem of adequately and efficiently monitoring lighting conditions at private and public places which lighting is typically provided for safety reasons. For example, automatic teller machines are commonly accessible for use by bank customers during both daytime and nighttime hours. Drive up locations and parking lots may be provided by businesses for their employees and customers for use both during daytime and nighttime hours. For safety reasons, these areas are lighted, and video equipment, such as cameras, are commonly provided to monitor and record assault or vandalism activities that may occur at such locations. One of the main shortcomings of video surveillance systems is the inability to detect loss of lighting of the area being monitored due to failure of the lighting fixtures or due to vandalism. Another failure can be caused by the loss of camera or video equipment power, video equipment damage, or loss of cable connections due to vandalism or storm damage, which will render the surveillance system inoperative. Also, in order to avoid identification, vandals may cover the surveillance cameras with objects or spray paint the lenses of the cameras. In any such event, the surveillance system is rendered ineffective. There is therefore a need for improvements to such systems by providing a way to detect when lighting conditions deteriorate and when the system becomes inoperative or tampered with by vandals.

SUMMARY OF THE INVENTION

The method and apparatus of the invention provides a way of constantly monitoring ambient lighting conditions using currently installed or new CCTV cameras, as well as detecting any loss of video caused by vandals covering or spray painting lenses, the loss of camera power, or the loss of camera cable connections. Existing levels of light at selected points within the monitored area are programmed into the system, and when the light level at any point falls below the programmed level, a failure is detected. In the event of any such failure, the system of the invention produces an alarm signal to notify an existing alarm station. The system of the invention also includes a black level detection system used to notify an alarm station in the event a video camera is blacked out by a vandal or due to other causes. The system of the invention uses the existing video equipment to provide a more efficient and economical way to detect the above-described problems. The present invention may also be incorporated into new equipment as an after market component, or as an integral part of a new surveillance system.

DESCRIPTION OF PREFERRED EMBODIMENT OF THE INVENTION

Figure 1:
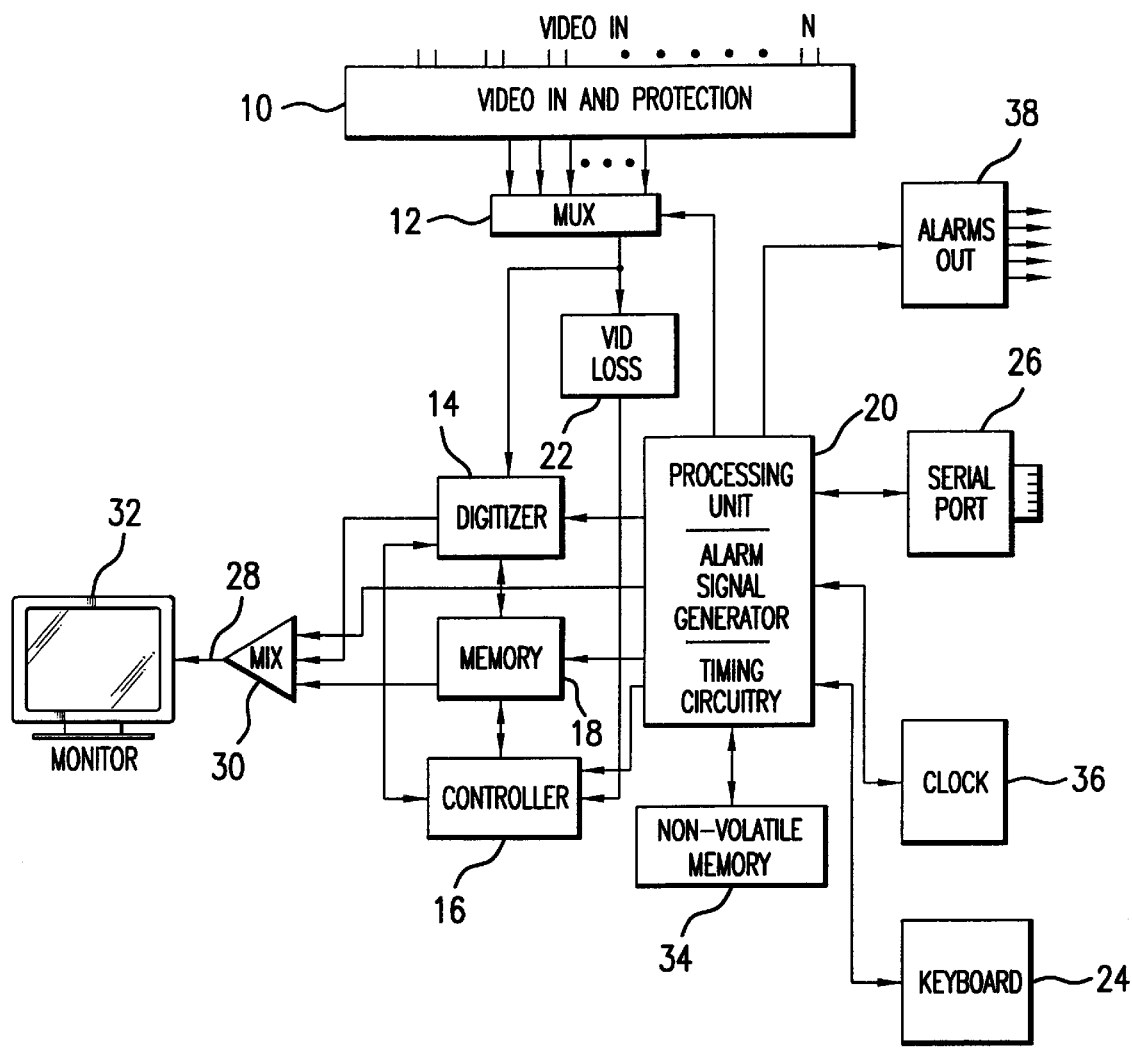
FIG. 1 is a schematic diagram of the interconnected components included in the best mode embodiment of the invention.

The system of the invention can be installed in any new or existing surveillance system that uses CCTV or other cameras to monitor a predetermined area of concern. Remote sensors may, but need not, be installed. Before the system of the invention is installed, light meter readings are taken at night to measure the luminance levels at the places to be monitored, making certain that the existing light levels are adequate to meet the mandated requirements. The light meter readings are documented by the installer and programmed into the system of the invention so that the system will "remember" the lighting environment as viewed through each camera of the surveillance system. The installer can then select points to be monitored within the viewing area of the surveillance cameras. In the presently preferred embodiment, the installer may select any of up to 180 points to be monitored within the viewing area of each surveillance camera. If the light level at the selected points deteriorates by more than a predetermined level programmed into the system, the system will trigger an alarm in the manner described hereinafter. An output is provided for easy connection to the alarm system for the premises being monitored. Alarm triggers may depend upon one or a predetermined combination of points using, for example, boolean logic to designate combinations. Reporting of alarm conditions can also be delayed for multiple predetermined periods such as 24 hour periods as described hereinafter.

Referring now to the schematic diagram of the drawing, there is illustrated the system of the invention installed in an existing surveillance system having one or more video cameras. The schematic illustrates the invention employed with any typical, well known surveillance system having one or a plurality of CCTV or other cameras that continuously monitor a predetermined field of view in the desired area, for example, around an automatic teller machine. The inputs 10 from the cameras are multiplexed or combined by the video multiplexor 12 into a video digitizer 14 which converts the luminance part of each video signal into digital levels. The video signals are sampled at the pre-selected points in the field of view of each camera, and these points are monitored for video level changes on a predetermined basis. In the presently preferred embodiment, monitoring of these points is continuous. The points being monitored are programmed into the system as described above, and the points are selected by a digitizer controller 16 which, for example, has a matrix of 12 rows of 15 equally distributed points for each camera. Controller 16 can thus monitor up to 180 points that are selected in the fields of view of the video cameras. The values at the selected points are saved in a memory 18 for use by the processing unit 20. The values of the luminance part of the video signals so saved are used by the processing unit 20 to determine the change in light sources or ambient light level changes in the field of view of the cameras. Change is determined by comparing the saved values of the video signals to the levels previously programmed into the system for each point. It will be apparent to one skilled in the art that the particular configuration of the processing unit, digitizer, controller, and memory is merely the presently preferred embodiment and that this disclosure is not limiting. These digital control components may be physically separated or integrated with one another or with components such as the multiplexor 12, timing and real-time clock circuitry, or input or output devices.

Once light degradation is detected, a first timer in the processing unit 20 is activated. The timer is used to assure that a harmless video disturbance (e.g., a person walking by a video camera) is not detected as a light degradation that would otherwise trigger an alarm. If the first timer indicates that a degradation does exist, a second timer is started to test the signal at a second point in time following the predetermined period of delay to determine if a degradation condition exists that warrants the giving of an alarm. This period of delay necessarily will depend on the particular application in which the system is used or on the setting under surveillance. A preferred secondary testing time is the same time of day within the next 24 hour period. If desired, the system can also be programmed so that a plurality of test periods are conducted before a valid alarm condition exists. In the presently preferred embodiment, up to seven consecutive 24 hour test periods may be conducted before a valid alarm condition exists. It will be understood by one of skill in the art that all periods of time selected by the user of the system may vary as appropriate for any particular application and to avoid false alarms due to light degradation expected from any anticipated interference.

Once a valid alarm condition is found, an alarm output 38 is sent for detection by a suitable alarm collection system. The system of the invention supplies an open collector signal to an "on" condition for the input of an alarm system, usually the existing alarm system for the premises being monitored. The alarm, once triggered, stays triggered until it is reset. The system may require an alarm reset to be performed manually. This manual feature of the preferred embodiment ensures that a system monitor receives notice of an alarm triggering condition. The system of the invention also has a real time clock 36 that is used to log the time and date of each alarm trigger for later reference.

The system of the invention also uses the luminance part of a video signal to look for video signal black out or blockage. This may happen if someone covers a camera (video source) with an object or spray paints the camera lens to block the video picture in an effort to avoid video detection of activity. The "black" level can be programmed in the system so that only some or all the points within the viewing area of each camera are monitored as discussed above. Black out or blockage detection is then based on a sensitivity level for the programmed points which level is selected from the levels available within the system. In the preferred embodiment, sensitivity levels may range from (0) to (255), (0) being the least sensitive and (255) being the most sensitive. The level for black detection is set so as not to produce false triggers from normal night time darkness or from dark produced during a storm during daytime. Once the user selects the desired level it is then programmed into the system. If substantially all selected points within the viewing area of a camera are at or below the selected value, the black level will be tested for a predetermined period of time before the level will qualify as a valid black alarm. The detection of a black alarm will also trigger an output as described above for detected light degradation, except that the alarm will stop if the level returns to a level above the programmed level. Black alarms may also be recorded for future reference.

The system of the invention also has the capability of monitoring and detecting the loss of sync or luminance which would produce a loss of video signals, such as would occur in the event of a camera failure. To accomplish this, the multiplexed video inputs 10 are also fed by video multiplexor 12 into a loss of video detector 22 which feeds into the digitizer controller 16. The desired level settings and false alarm qualifiers for loss of video, and for other types of alarm conditions, are programmed into the processing unit 20 through the use of the keyboard section 24 or the serial input/output port section 26. A qualifying timer is used to eliminate false or fast intermittent signals from triggering an alarm. If an alarm is triggered, it will reset automatically if the video signal returns.

For all of the detection features of the system of the invention, the program menus are displayed on monitor 32 controlled by the output 28 from a video character mixer section 30. The monitor output 32 is a standard composite video signal monitor and is used to program the system as well as to view the timers and alarm logs. All settings programmed into the system are stored for normal operation in non-volatile memory (flash memory) 34. A real time clock 36 is used to supply the time and date for the processing unit 20 for use in setting parameters for valid alarms and to supply a time and date for use by the processing unit 20 in storing the time of alarms in the alarm log. The alarm output signals 38 are supplied to the desired alarm stations, preferably the stations of the existing surveillance system. The alarm outputs signals 38 are isolated open collector outputs for ground fault protection of the alarm stations. The alarm output signals 38 differentiate whether an alarm is for light degradation, black level, loss of video, alarm in progress, or trouble in the system such as loss of power or lockup.

To allow monitoring of the light degradation alarms and to prevent false triggers, a specific time period during which the detection system is- active can be programmed into the processing unit 20. The normally programmed time would be from about 10:00 pm to 4:00 am, since this is the normal time period of interest for safety concerns. The selected points within the viewing area of the cameras may also be programmed into the system so that detection at any one point will trigger an alarm signal, or the program can require that detection occur at a predetermined combination of points before an alarm signal is triggered. Any points can either be disabled in the program for monitoring or enabled for monitoring to determine if the digital levels meet the values programmed into the system for either light degradation levels or detection of black levels.

Having thus described the invention in connection with the preferred embodiment thereof, it will be evident to those skilled in the art that various revisions and modifications can be made to the preferred embodiments without departing from the spirit of the invention. For example, the system of the invention is capable of monitoring any number of video signals. Components of the system can be combined or added to the functions of components such as video multiplexors, video switchers, video matrix controllers, or any other type of video process equipment both analog and digital. It is my intention, however, that all such revisions and modifications that are obvious to those skilled in the art will be included within the scope of the following claims.

What is claimed is as follows:

1. A computerized light monitoring system for use in combination with a video surveillance system that includes a surveillance camera producing video signals corresponding to light levels within a defined field of view, said monitoring system comprising:

a video signal input pathway for receiving video signals from the surveillance camera;

a digitizer combined with the signal input pathway for translating video signals into digital light level data;

a digitizer controller combined with the digitizer for selecting light level data corresponding to predetermined sample points within the field of view;

a first memory combined with the digitizer and digitizer controller for storing selected light level data;

a second memory combined with the processing unit for storing normal operation settings programmed into the monitoring system;

a loss of video signal detector combined with the video signal input pathway and digitizer controller for detecting a loss of video signals from the video camera;

a processing unit having a data input pathway and a data output pathway combined with the digitizer, digitizer controller, and first and second memories, said processing unit detecting degradation of light levels within a field of view, detecting black level conditions, and detecting a loss of video signal from the system and producing an output signal over the data output pathway corresponding to the condition detected;

an alarm signal generator combined with the processing unit and being capable of generating at least one alarm signal; and timing circuitry combined with the processing unit for monitoring a durational requirement associated with an alarm condition.

2. The light monitoring device of claim 1 further comprising: a multiplexor combined with the video signal input pathway.

3. The light monitoring device of claim 1 further comprising: real time clock circuitry combined with the processing unit to enable recording of time corresponding to occurrence of alarm condition events.

4. The light monitoring device of claim 1 wherein the processing unit data input pathway comprises a keyboard.

5. The light monitoring device of claim 1 wherein the processing unit data input and output pathways comprise a serial port.

6. The light monitoring device of claim 1 wherein the second memory is a non-volatile memory and is for storing data comprising user input reference light levels, light level degradation tolerance levels, black level sensitivity, and valid alarm condition requirements for light level degradation alarms, loss of video signal alarms, and black level alarms.

7. The light monitoring device of claim 1 further comprising: a video signal output pathway combined with the processing unit, digitizer, and first and second memories, and in which the video signal output is a standard composite video signal for composite monitors.

8. The light monitoring device of claim 1 wherein the predetermined sample points comprise a matrix of 12 by 15 points contained in the monitored field of view.

9. A method for use in combination with a video surveillance system that includes a surveillance camera producing video signals corresponding to light levels within a defined field of view for detecting degradation of light levels within the field of view, detecting interference with the surveillance system, and detecting and reporting a loss of video signal from the system, said method comprising the steps of:

creating reference light levels at selected sample points within the field of view;

receiving a video signal containing luminance data relating to one or more of the selected sample points within the field of view;

monitoring and storing the luminance data;

performing light degradation alarm condition verification steps if the luminance data indicates that light levels for the selected sample points are less than the reference light levels corresponding to these points by an amount greater than a predetermined light level degradation tolerance;

generating a light degradation alarm signal if the light degradation alarm condition verification steps demonstrate that a valid light degradation alarm condition exists;

performing black level alarm condition verification steps if the luminance data indicates that light levels for the selected sample points are less than the reference light levels corresponding to these points by an amount greater than a predetermined black level sensitivity tolerance;

generating a black level alarm signal if the black level alarm condition verification steps demonstrate that a valid black level alarm condition exists;

monitoring the video signal to detect a loss of synchronization or luminance corresponding to a loss of video signal;

performing loss of video signal alarm condition verification steps if the loss of video signal is detected; and generating a loss of video signal alarm signal if the loss of video signal alarm condition verification steps demonstrate that a valid loss of video signal alarm condition exists.

10. The method of claim 9 wherein the light level degradation verification steps comprise the steps of:

testing for a predetermined period of time the light level data corresponding to the point or combination of points that have indicated a light level degradation; and verifying existence of a valid light level degradation alarm condition if the light level degradation has been maintained throughout the predetermined period of time.

11. The method of claim 9 wherein the light level degradation verification steps comprise the steps of:

performing an initial test for a first predetermined period of time to determine if the light level data corresponding to the point or combination of points that have indicated a light level degradation continue to indicate the presence of a light level degradation;

performing a predetermined number of follow up tests to determine if the light level data corresponding to the point or combination of points that have indicated a light level degradation continue to indicate the presence of a light level degradation throughout periods of time comprising the first predetermined period of time and following at least one light level degradation verification delay period comprising a second predetermined period of time; and verifying the existence of a valid light level degradation alarm condition if the light level degradation is detected throughout the initial verification test and the predetermined number of follow up verification tests.

12. The method of claim 9 wherein the black level degradation verification steps comprise the steps of:

testing for a predetermined period of time the light level data corresponding to the point or combination of points that have indicated a black level; and verifying the existence of a valid black level alarm condition if the black level has been maintained throughout the predetermined period of time.

13. The method of claim 9 wherein the black level degradation verification steps comprise the steps of:

performing an initial test for a first predetermined period of time to determine if the light level data corresponding to the point or combination of points that have indicated a black level continue to indicate the presence of a black level;

performing a predetermined number of follow up tests to determine if the light level data corresponding to the point or combination of points that have indicated a black level continue to indicate the presence of a black level throughout periods of time comprising the first predetermined period of time and following at least one black level verification delay period comprising a second predetermined period of time;

verifying the existence of a valid black level alarm condition if the black level is detected throughout the initial verification test and the predetermined number of follow up verification tests.

14. The method of claim 9 wherein the loss of video verification steps comprise:

testing the luminance portion of the signal for a predetermined period of time to detect the loss of video and eliminate false alarms based on fast or intermittent signals.

15. The method of claim 9 further comprising the step of:

logging the time corresponding to the generation of a valid alarm condition signal.

16. The method of claim 9 wherein the generation of black level alarm condition signals is stopped upon determination that the monitored light levels are no longer below black level sensitivity levels.

17. The method of claim 9 wherein a light level degradation alarm condition signal must be terminated manually.

* * * * *